(12) United States Patent
Saito et al.

(10) Patent No.: US 7,912,610 B2
(45) Date of Patent: Mar. 22, 2011

(54) CONTROL APPARATUS FOR VEHICLE HAVING COOPERATIVE CONTROL UNIT

(75) Inventors: Kazutaka Saito, Saitama (JP); Akira Nakamuta, Saitama (JP); Masahiko Niki, Saitama (JP); Satoshi Hiyama, Saitama (JP); Masato Yuda, Saitama (JP); Hiroshi Hashimoto, Saitama (JP); Yukihiro Fujiwara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1060 days.

(21) Appl. No.: 11/710,745

(22) Filed: Feb. 26, 2007

(65) Prior Publication Data
US 2007/0213898 A1 Sep. 13, 2007

(30) Foreign Application Priority Data

Mar. 8, 2006 (JP) ................................ 2006-062090

(51) Int. Cl.
*G06F 7/00* (2006.01)
*G05D 1/00* (2006.01)
(52) U.S. Cl. ............... 701/48; 701/70; 701/36; 701/41; 307/9.1
(58) Field of Classification Search ............... 701/48; 280/5.503
See application file for complete search history.

(56) References Cited

U.S. PATENT DOCUMENTS

| 6,463,373 | B2 * | 10/2002 | Suganuma et al. | 701/48 |
|---|---|---|---|---|
| 7,162,333 | B2 * | 1/2007 | Koibuchi et al. | 701/1 |
| 7,590,481 | B2 * | 9/2009 | Lu et al. | 701/70 |
| 7,689,337 | B2 * | 3/2010 | Post, II | 701/48 |
| 2004/0044443 | A1 * | 3/2004 | Eriksson | 701/1 |
| 2004/0128044 | A1 * | 7/2004 | Hac | 701/48 |
| 2005/0149243 | A1 * | 7/2005 | Ghoneim | 701/48 |
| 2006/0041360 | A1 * | 2/2006 | Post | 701/48 |
| 2007/0021896 | A1 * | 1/2007 | O'Dea | 701/70 |
| 2008/0294301 | A1 * | 11/2008 | Kaigawa et al. | 701/1 |
| 2009/0259370 | A1 * | 10/2009 | Kaigawa et al. | 701/48 |
| 2010/0017066 | A1 * | 1/2010 | Lu et al. | 701/45 |

FOREIGN PATENT DOCUMENTS

| JP | 62-260283 | 11/1987 |
|---|---|---|
| JP | 62-260284 | 11/1987 |
| JP | 05-262190 | 10/1993 |

* cited by examiner

*Primary Examiner* — Thomas G Black
*Assistant Examiner* — Lin B Olsen
(74) *Attorney, Agent, or Firm* — Carrier Blackman & Associates, P.C.; William D. Blackman; Joseph P. Carrier

(57) ABSTRACT

A control apparatus for a vehicle including an inertia force sensor for detecting an inertia force generated in the vehicle and a cooperative control unit connected to the inertia force sensor and connected also to a braking/driving force control unit and a steering control unit so that bidirectional communication is allowed, for deciding and outputting controlled variables or controlled correction variables of the braking/driving force control unit and the steering control unit according to the inertia force detected by the inertia force sensor and according to controlled conditions of the braking/driving force control unit and the steering control unit.

9 Claims, 2 Drawing Sheets

CONTROL APPARATUS FOR VEHICLE HAVING COOPERATIVE CONTROL UNIT

BACKGROUND OF THE INVENTION

1. Field of the Invention

The present invention relates to a control apparatus for a vehicle which can cooperatively control various control systems mounted on an automobile.

2. Description of the Related Art

Mounted on an automobile are an engine control system, a transmission control system, and other various control systems for controlling the motion or attitude of the automobile. Such control systems include a skid control system, electric power steering system, active damper system, active stabilizer system, adaptive cruise control system, and 4WD control system.

Further mounted on the vehicle is a sensor unit incorporating various acceleration sensors for detecting accelerations required for the control of the above control systems and various angular velocity sensors for detecting yaw, roll, and pitch rates of the vehicle. The conditions of the various control systems are individually detected depending on the respective purposes, and the control systems are individually controlled by using the accelerations and/or angular velocities detected in the sensor unit.

Japanese Patent Laid-open No. Sho 62-260283 discloses a sensor signal processing apparatus for an automobile such that a plurality of signals from various sensors mounted on the automobile are input into the processing apparatus and processed so as to allow easy use by various control units, and these processed signals are distributed to the various control units. Further, Japanese Patent Laid-open No. Sho 62-260284 discloses a sensor signal processing apparatus for an automobile such that a plurality of signals from various sensors mounted on the automobile are input into the processing apparatus and processed so as to allow easy use by various control units, that these processed signals are distributed to the various control units, and that information processed in the various control units is interchanged therebetween. Further, Japanese Patent Laid-open No. Hei 5-262190 discloses an integrated control apparatus for an automobile such that the number of wires required for integrated control of the automobile is reduced.

With the advance of an electronic control system for an automobile, it has been found that the cooperative control of various control systems rather than the individual control thereof has great value. Accordingly, a control unit for performing integrated cooperative control of the various control systems is necessary. If the control unit is mounted as new hardware, a cost increase and an increase in installation area for an electronic control unit are invited.

In the technique disclosed in Japanese Patent Laid-open No. Sho 62-260283, the sensor signal processing apparatus merely functions to process the signals from the various sensors so that the control units can easily use the input signals and to distribute the processed signals to the control units. Further, in the technique disclosed in Japanese Patent Laid-open No. Sho 62-260284, the sensor signal processing apparatus includes the configuration of the technique disclosed in Japanese Patent Laid-open No. Sho 62-260283 and has an additional function of controlling the control units so that the information processed in the control units can be interchanged therebetween. However, there is no mention in each publication cited above as to whether the sensor signal processing apparatus is connected to each control unit so as to allow bidirectional communication and performs integrated cooperative control of the control units.

SUMMARY OF THE INVENTION

It is therefore an object of the present invention to provide a control apparatus for a vehicle which can perform integrated cooperative control of various control systems by installing an integrated cooperative control algorithm in a sensor unit including various sensors.

In accordance with an aspect of the present invention, there is provided a control apparatus for a vehicle including at least two sensors selected from the group consisting of (a) a wheel speed sensor for detecting a wheel speed, (b) a steering information sensor for detecting steering information brought by a driver, and (c) a stroke sensor for detecting a stroke of a suspension; at least two control units selected from the group consisting of (d) a braking/driving force control unit connected to the wheel speed sensor for controlling a braking force or a driving force for a wheel according to the wheel speed detected by the wheel speed sensor, (e) a steering control unit connected to the steering information sensor for controlling a steered amount of the wheel according to the steering information detected by the steering information sensor, and (f) a suspension control unit connected to the stroke sensor for controlling the suspension according to the stroke detected by the stroke sensor; an inertia force sensor for detecting an inertia force generated in the vehicle; and a cooperative control unit connected to the inertia force sensor and connected also to the at least two control units so that bidirectional communication is allowed, for deciding and outputting a controlled variable or controlled correction variable of at least one of the at least two control units according to the inertia force detected by the inertia force sensor and according to controlled conditions of the at least two control units.

Preferably, the inertia force sensor includes a plurality of inertia force sensors for detecting a plurality of different inertia forces generated in the vehicle; and the cooperative control unit computes a momentum of the vehicle according to the plurality of inertia forces detected by the plurality of inertia force sensors and outputs a result of this computation, the momentum of the vehicle being different from at least two of the wheel speed, the steering information, and the stroke and also different from the plurality of inertia forces.

Preferably, one of the at least two sensors is the wheel speed sensor; and the cooperative control unit computes the momentum of the vehicle according to the wheel speed detected by the wheel speed sensor. More preferably, the plurality of inertia force sensors include a lateral acceleration sensor for detecting a lateral acceleration of the vehicle and a yaw rate sensor for detecting a yaw rate of the vehicle; and the momentum of the vehicle is skid information computed according to a vehicle speed, the lateral acceleration, and the yaw rate, the vehicle speed being obtained according to the wheel speed.

Preferably, in the event of a failure of the cooperative control unit including a failure of the inertia force sensor, the at least two control units perform individual control according to detection values output from the at least two sensors.

According to the present invention, it is possible to suppress an increase in amount of computation by at least two of the braking/driving force control unit, the steering control unit, and the suspension control unit and simultaneously to add a cooperative control function. Further, in the event of a failure of the inertia force sensor or the cooperative control unit, individual control by the braking/driving force control unit, the steering control unit, and the suspension control unit can be performed.

In accordance with another aspect of the present invention, there is provided a control apparatus for a vehicle including at least two sensors selected from the group consisting of (a) a wheel speed sensor for detecting a wheel speed, (b) a steering information sensor for detecting steering information brought by a driver, and (c) a stroke sensor for detecting a stroke of a suspension; at least two control units selected from the group consisting of (d) a braking/driving force control unit connected to the wheel speed sensor for controlling a braking force or a driving force for a wheel according to the wheel speed detected by the wheel speed sensor, (e) a steering control unit connected to the steering information sensor for controlling a steered amount of the wheel according to the steering information detected by the steering information sensor, and (f) a suspension control unit connected to the stroke sensor for controlling the suspension according to the stroke detected by the stroke sensor; a plurality of inertia force sensors for detecting a plurality of different inertia forces generated in the vehicle; and a momentum computing unit connected to the plurality of inertia force sensors and connected also to the at least two control units so that bidirectional communication is allowed, for computing a momentum of the vehicle according to the plurality of different inertia forces detected by the plurality of inertia force sensors and outputting a result of this computation, the momentum of the vehicle being different from at least two of the wheel speed, the steering information, and stroke and also different from the plurality of inertia forces.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
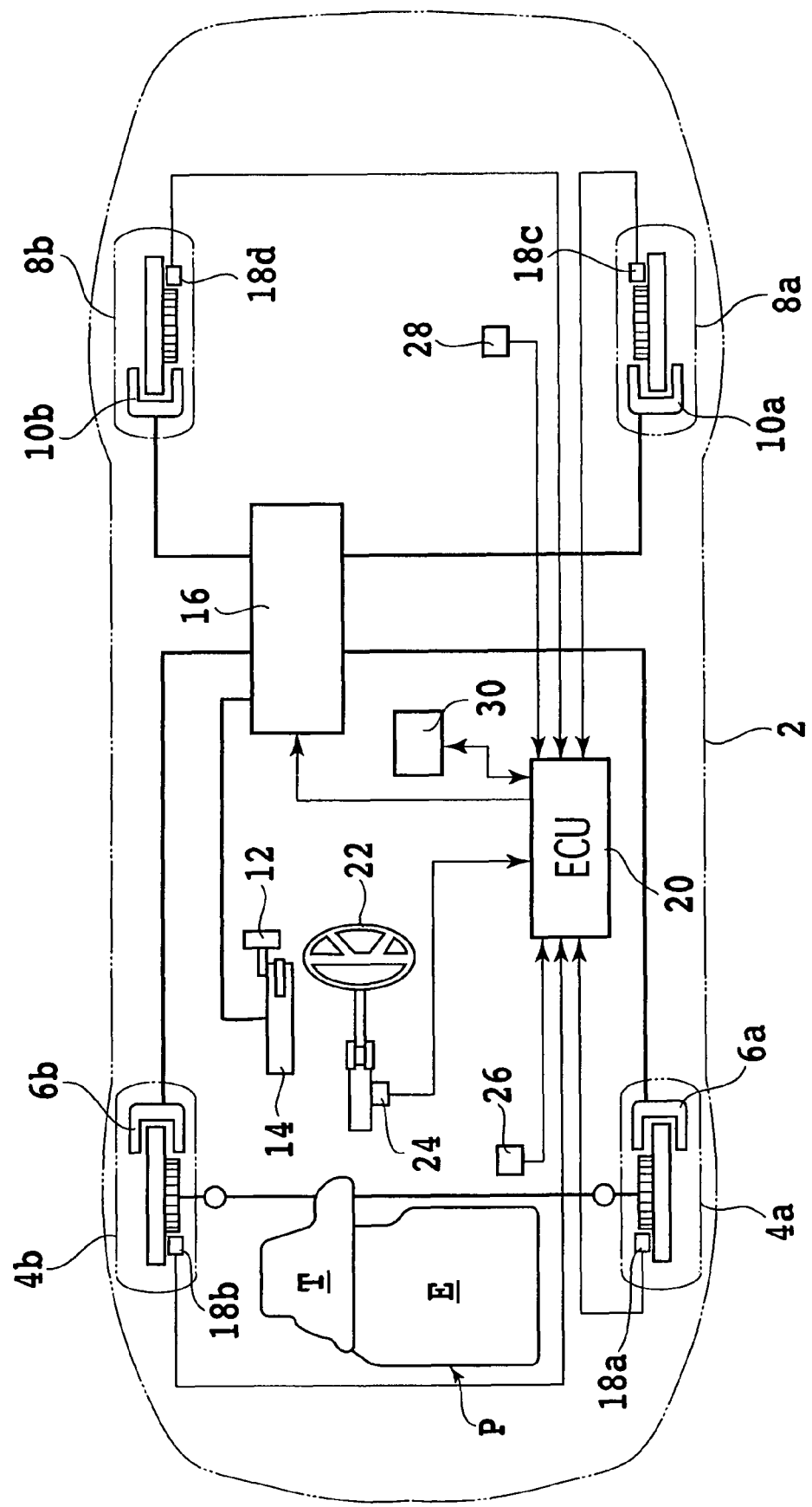
FIG. 1 is a schematic diagram showing the arrangement of various sensors in an FF vehicle to which the control apparatus according to the present invention is applicable.

There will now be described a control apparatus for a vehicle according to a preferred embodiment of the present invention with reference to the drawings. FIG. 1 is a schematic diagram showing the arrangement of various sensors in a front-engine front-drive (FF) vehicle to which the control apparatus according to the present invention is applicable. Reference numeral 2 generally denotes a vehicle body of the FF vehicle. A power unit P consisting of an engine E and a transmission T is mounted on the vehicle body 2 at a front portion thereof so as to drive a left front wheel 4a and a right front wheel 4b as drive wheels. The left and right front wheels 4a and 4b are respectively provided with left and right front brakes 6a and 6b.

On the other hand, reference numerals 8a and 8b respectively denote left and right rear wheels as driven wheels, which are respectively provided with left and right rear brakes 10a and 10b. Each of these brakes 6a, 6b, 10a, and 10b is a disc brake, for example. Reference numeral 14 denotes a tandem brake master cylinder for outputting a brake fluid pressure according to a depressive operation of a brake pedal 12. A brake fluid pressure circuit 16 is provided to supply to the brakes 6a, 6b, 10a, and 10b fluid pressures according to this brake fluid pressure output from the tandem brake master cylinder 14, thereby braking the front wheels 4a and 4b and the rear wheels 8a and 8b.

The front wheels 4a and 4b are respectively provided with wheel speed sensors 18a and 18b for detecting the front wheel speeds, and the rear wheels 8a and 8b are respectively provided with wheel speed sensors 18c and 18d for detecting the rear wheel speeds. Detection signals from these wheel speed sensors 18a, 18b, 18c, and 18d are input into an electronic control unit (ECU) 20. Reference numeral 24 denotes a steering angle sensor (steering information sensor), which functions to detect a steering angle of a steering wheel 22 operated by a driver. A detection signal from the steering angle sensor 24 is input into the ECU 20. In this preferred embodiment, the steering is controlled by an electric power steering system (EPS), for example.

A front stroke sensor 26 is provided at the front portion of the vehicle body 2, and a rear stroke sensor 28 is provided at the rear portion of the vehicle body 2. Detection signals from these front and rear stroke sensors 26 and 28 are input into the ECU 20, which in turn controls a front suspension and a rear suspension. Reference numeral 30 denotes an integrated cooperative inertia sensor ECU, which is connected to the ECU 20 so that bidirectional communication is allowed. Although the ECU 20 is shown by one block in FIG. 1, it is actually divided into a plurality of ECUs including a brake ECU 32, EPS ECU 34, damper ECU 36, and stabilizer ECU 38 as shown in FIG. 2.

Figure 2:
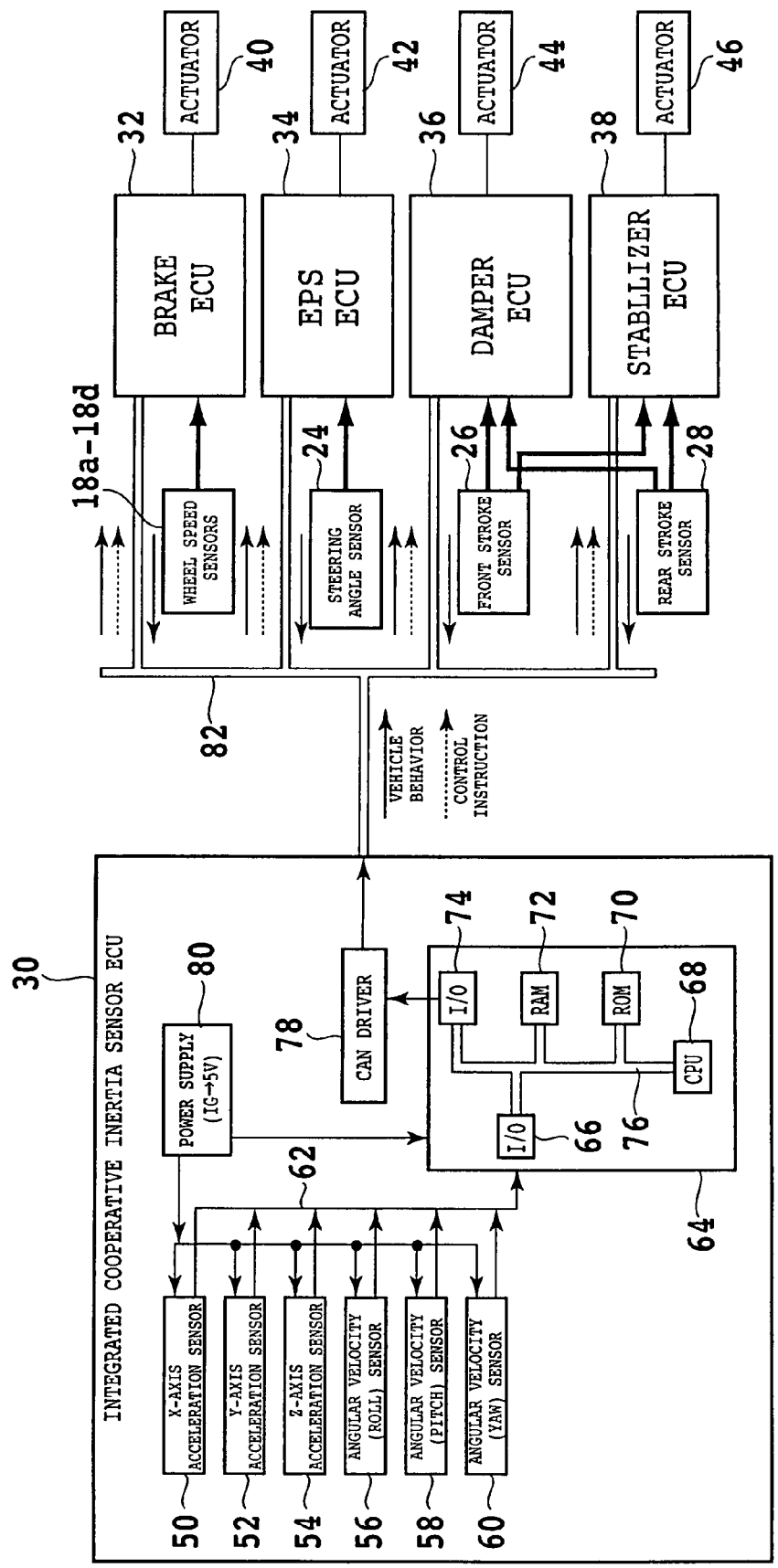
FIG. 2 is a block diagram showing a system configuration of a control apparatus according to a preferred embodiment of the present invention.

The control apparatus according to this preferred embodiment will now be described in detail with reference to FIG. 2 showing a system configuration. The integrated cooperative inertia sensor ECU 30 includes an X-axis acceleration sensor 50, Y-axis acceleration sensor 52, Z-axis acceleration sensor 54, angular velocity (roll) sensor 56, angular velocity (pitch) sensor 58, and angular velocity (yaw) sensor 60. These sensors 50 to 60 are mounted on a printed wiring board. The term of "inertia force" used in this description and claims is so defined as to include an angular velocity and an acceleration, and the term of "inertia force sensor" is so defined as to include an angular velocity sensor and an acceleration sensor.

The X-axis acceleration sensor 50 functions to detect an acceleration in the longitudinal direction of the vehicle. The Y-axis acceleration sensor 52 functions to detect an acceleration in the lateral direction of the vehicle. The Z-axis acceleration sensor 54 functions to detect an acceleration in the vertical direction of the vehicle. These sensors 50 to 60 are connected through wiring 62 to a microprocessor unit 64. Although the wiring 62 is shown by one line for simplicity of illustration, the sensors 50 to 60 are actually connected through individual wires to the microprocessor unit 64.

The microprocessor unit 64 includes an I/O interface 66, CPU 68, ROM 70, RAM 72, and I/O interface 74. Detection signals from the sensors 50 to 60 are input into the I/O interface 66. The I/O interface 66, the CPU 68, the ROM 70, the RAM 72, and the I/O interface 74 are interconnected through a bus 76. Reference numeral 80 denotes a power supply for converting an ignition voltage (12 V) into 5 V. The power supply 80 is connected to the sensors 50 to 60 and the microprocessor unit 64 to drive these components.

An output from the microprocessor unit 64 is input through the I/O interface 74 into a CAN driver (controller area network driver) 78. The CAN driver 78 is a bidirectional communication control circuit, which allows intercommunication between the integrated cooperative inertia sensor ECU 30 and each of the brake ECU 32, the EPS ECU 34, the damper ECU 36, and the stabilizer ECU 38 through a bus 82.

Detection signals from the wheel speed sensors 18a to 18d are input into the brake ECU 32. A detection signal from the steering angle sensor 24 is input into the EPS ECU 34. Detection signals from the front stroke sensor 26 and the rear stroke sensor 28 are input into the damper ECU 36. Detection signals from the front stroke sensor 26 and the rear stroke sensor 28 are also input into the stabilizer ECU 38. The damper ECU 36 and the stabilizer ECU 38 constitute a suspension ECU. The brake ECU 32 is connected to an actuator 40 such as a motor to control the actuator 40. The EPS ECU 34 is connected to an actuator 42 such as a motor to control the actuator 42. The damper ECU 36 is connected to an actuator 44 such as a damper to control the actuator 44. The stabilizer ECU 38 is connected to an actuator 46 such as a motor to control the actuator 46.

An integrated cooperative control algorithm is preinstalled as a software program in the ROM 70 of the microprocessor unit 64. The integrated cooperative control algorithm is so programmed as to cooperatively control the brake ECU 32, the EPS ECU 34, the damper ECU 36, and the stabilizer ECU 38 according to the momentum of the vehicle and the controlled conditions of the ECUs 32 to 38 both computed by the CPU 68 according to the outputs from the sensors 50 to 60. More specifically, the signal outputs from the sensors 50 to 60 are read through the I/O interface 66 into the RAM 72, and the CPU 68 computes the momentum of the vehicle and the controlled variables or controlled correction variables of the brake ECU 32, the EPS ECU 34, the damper ECU 36, and the stabilizer ECU 38 according to the outputs from the sensors 50 to 60.

The controlled variables or controlled correction variables computed by the CPU 68 are output through the I/O interface 74 to the CAN driver 78. The CAN driver 78 transmits vehicle behavior signals and control signals through the bus 82 to the brake ECU 32, the EPS ECU 34, the damper ECU 36, and the stabilizer ECU 38 to optimally cooperatively control these ECUs 32 to 38.

In this preferred embodiment, the integrated cooperative inertia sensor ECU 30 has a cooperative control function of cooperatively controlling the ECUs 32 to 38 and a momentum computing function of computing the momentum of the vehicle according to the inertia forces detected by the inertia force sensors 50 to 60, the momentum of the vehicle being different from at least two of the wheel speed, the steering information, and the stroke and also different from the inertia forces. However, the present invention is not limited to this configuration. For example, the integrated cooperative inertia sensor ECU 30 may have only the cooperative control function or may function solely as a momentum computing unit for computing the momentum of the vehicle according to the inertia forces detected by the inertia force sensors 50 to 60 without performing the cooperative control.

In the case that the integrated cooperative inertia sensor ECU 30 functions solely as such a momentum computing unit, the momentum (or momenta) computed according to the outputs from the inertia force sensors 50 to 60 is input into the brake ECU 32, the EPS ECU 34, the damper ECU 36, and the stabilizer ECU 38, thereby allowing finer control of the brakes, the EPS, the dampers, and the stabilizers. For example, a skid angular velocity as a momentum of the vehicle is calculated in the following manner. A lateral G (lateral acceleration) detected by the Y-axis acceleration sensor 52 is divided by a vehicle speed V obtained from the wheel speed sensors 18a to 18d, and a yaw rate detected by the yaw rate sensor 60 is subtracted from a quotient as the result of division conducted above, thus obtaining the skid angular velocity. A skid angle (slip angle) is obtained by integrating the skid angular velocity.

The skid angular velocity and/or the skid angle obtained above are/is input into the brake ECU 32 and the EPS ECU 34, for example, thereby allowing higher-precision control of the brakes and the steering. In the event of a failure of the integrated cooperative inertia sensor ECU 30 including a failure of the acceleration sensors 50 to 54 and the angular velocity sensors 56 to 60, the brake ECU 32, the EPS ECU 34, the damper ECU 36, and the stabilizer ECU 38 can perform individual control, so that the controllability of each ECU as a conventional system is not lost.

While the present invention is applied to the cooperative control of the brake ECU 32, the EPS ECU 34, the damper ECU 36, and the stabilizer ECU 38 in the above preferred embodiment, the applicability of the present invention is not limited to the above preferred embodiment. For example, the present invention is also applicable to the cooperative control of a skid control system, adaptive cruise control system, lane keep control system, and 4WD control system.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A control apparatus for a vehicle comprising:
   at least two sensors selected from the group consisting of (a) a wheel speed sensor for detecting a wheel speed, (b) a steering information sensor for detecting steering information inputted by a driver, and (c) a stroke sensor for detecting a stroke of a suspension;
   at least two control units selected from the group consisting of (d) a braking/driving force control unit directly connected to said wheel speed sensor for controlling a braking force or a driving force for a wheel according to the wheel speed detected by said wheel speed sensor, (e) a steering control unit connected to said steering information sensor for controlling a steered amount of said wheel according to the steering information detected by said steering information sensor, and (f) a suspension control unit directly connected to said stroke sensor for controlling said suspension according to the stroke detected by said stroke sensor;
   an inertia force sensor for detecting an inertia force generated in said vehicle; and
   a cooperative control unit directly connected to said inertia force sensor and connected also to said at least two control units so that bidirectional communication is allowed, for deciding and outputting a controlled variable or controlled correction variable of at least one of said at least two control units according to the inertia force detected by said inertia force sensor and according to the conditions controlled by said at least two control units.

2. The control apparatus for a vehicle according to claim 1, wherein:
   said inertia force sensor comprises a plurality of inertia force sensors for detecting a plurality of different inertia forces generated in said vehicle; and
   said cooperative control unit computes a momentum of said vehicle according to said plurality of different inertia forces detected by said plurality of inertia force sensors and outputs a result of this computation, said momentum of said vehicle being different from at least two of said wheel speed, said steering information, and said stroke and also different from said plurality of different inertia forces.

3. The control apparatus for a vehicle according to claim 2, wherein:
one of said at least two sensors is said wheel speed sensor; and
said cooperative control unit computes said momentum of said vehicle according to said wheel speed detected by said wheel speed sensor.

4. The control apparatus for a vehicle according to claim 3, wherein:
said plurality of inertia force sensors comprise a lateral acceleration sensor for detecting a lateral acceleration of said vehicle and a yaw rate sensor for detecting a yaw rate of said vehicle; and
said momentum of said vehicle is skid information computed according to a vehicle speed, said lateral acceleration, and said yaw rate, said vehicle speed being obtained according to said wheel speed.

5. The control apparatus for a vehicle according to claim 1, wherein in the event of a failure of said cooperative control unit including a failure of said inertia force sensor, said at least two control units perform individual control according to detection values output from said at least two sensors.

6. A control apparatus for a vehicle comprising:
at least two sensors selected from the group consisting of (a) a wheel speed sensor for detecting a wheel speed, (b) a steering information sensor for detecting steering information inputted by a driver, and (c) a stroke sensor for detecting a stroke of a suspension;
at least two control units selected from the group consisting of (d) a braking/driving force control unit directly connected to said wheel speed sensor for controlling a braking force or a driving force for a wheel according to the wheel speed detected by said wheel speed sensor, (e) a steering control unit connected to said steering information sensor for controlling a steered amount of said wheel according to the steering information detected by said steering information sensor, and (f) a suspension control unit directly connected to said stroke sensor for controlling said suspension according to the stroke detected by said stroke sensor;
a plurality of inertia force sensors for detecting a plurality of different inertia forces generated in said vehicle; and
a momentum computing unit directly connected to said plurality of inertia force sensors and connected also to said at least two control units so that bidirectional communication is allowed, for computing a momentum of said vehicle according to said plurality of different inertia forces detected by said plurality of inertia force sensors and outputting a result of this computation, said momentum of said vehicle being different from at least two of said wheel speed, said steering information, and stroke and also different from said plurality of inertia forces.

7. The control apparatus for a vehicle according to claim 6, wherein:
one of said at least two sensors is said wheel speed sensor; and
said momentum computing unit computes said momentum of said vehicle according to said wheel speed detected by said wheel speed sensor.

8. The control apparatus for a vehicle according to claim 7, wherein:
said plurality of inertia force sensors comprise a lateral acceleration sensor for detecting a lateral acceleration of said vehicle and a yaw rate sensor for detecting a yaw rate of said vehicle; and
said momentum of said vehicle is skid information computed according to a vehicle speed, said lateral acceleration, and said yaw rate, said vehicle speed being obtained according to said wheel speed.

9. The control apparatus for a vehicle according to claim 6, wherein in the event of a failure of said momentum computing unit including a failure of at least one of said plurality of said inertia force sensors, said at least two control units perform individual control according to detection values output from said at least two sensors.

* * * * *